(12) United States Patent
Shtukater

(10) Patent No.: US 9,175,975 B2
(45) Date of Patent: Nov. 3, 2015

(54) SYSTEMS AND METHODS FOR NAVIGATION

(71) Applicant: Aleksandr Shtukater, FairLawn, NJ (US)

(72) Inventor: Aleksandr Shtukater, FairLawn, NJ (US)

(73) Assignee: RaayonNova LLC, FairLawn, NJ (US)

( * ) Notice: Subject to any disclaimer, the term of this patent is extended or adjusted under 35 U.S.C. 154(b) by 0 days.

(21) Appl. No.: 14/183,685

(22) Filed: Feb. 19, 2014

(65) Prior Publication Data

US 2014/0172296 A1 Jun. 19, 2014

Related U.S. Application Data

(63) Continuation-in-part of application No. 13/561,726, filed on Jul. 30, 2012, now Pat. No. 8,666,655.

(51) Int. Cl.
| | | |
|---|---|---|
| G01C 21/00 | (2006.01) | |
| G01C 21/36 | (2006.01) | |
| G01S 19/13 | (2010.01) | |
| G01S 5/02 | (2010.01) | |
| G06T 19/00 | (2011.01) | |
| G06T 19/20 | (2011.01) | |

(52) U.S. Cl.
CPC ............ G01C 21/3647 (2013.01); G01S 5/0205 (2013.01); G01S 5/0263 (2013.01); G01S 19/13 (2013.01); G06T 19/006 (2013.01); G06T 19/20 (2013.01); G06T 2215/16 (2013.01); G06T 2219/2012 (2013.01)

(58) Field of Classification Search
CPC .. G01C 21/3647; G06T 19/20; G06T 19/006; G06T 2215/16; G06T 2219/2012; G01S 5/0205; G01S 19/13; G01S 5/0263
USPC ........................................................ 701/428
See application file for complete search history.

(56) References Cited

U.S. PATENT DOCUMENTS

| | | | |
|---|---|---|---|
| 6,285,317 B1 | 9/2001 | Ong | |
| 7,239,760 B2 | 7/2007 | Di Bernardo | |
| 7,471,292 B2 | 12/2008 | Li | |
| 7,949,150 B2 | 5/2011 | Haering et al. | |
| 7,990,394 B2 | 8/2011 | Vincent et al. | |
| 8,180,567 B2 * | 5/2012 | Geelen et al. | 701/431 |
| 8,352,181 B2 | 1/2013 | Hagiwara | |
| 2003/0160153 A1 | 8/2003 | Hara et al. | |
| 2008/0253685 A1 | 10/2008 | Kuranov et al. | |
| 2009/0125234 A1 * | 5/2009 | Geelen et al. | 701/209 |
| 2009/0254268 A1 * | 10/2009 | Figueroa | 701/201 |
| 2011/0074926 A1 | 3/2011 | Khan et al. | |
| 2011/0096832 A1 | 4/2011 | Zhang et al. | |
| 2011/0103651 A1 | 5/2011 | Nowak et al. | |
| 2012/0191346 A1 | 7/2012 | Geelen et al. | |

* cited by examiner

Primary Examiner — Mary Cheung
Assistant Examiner — Anne Mazzara

(57) ABSTRACT

The present invention relates to a navigation device. The navigation device is arranged to dynamically generate multi-dimensional video signals based on location and directional information of the navigation device from 3D data set. The navigation device is further arranged to superimpose navigation directions and/or environment information about surrounding objects onto the generated multidimensional view.

16 Claims, 6 Drawing Sheets

SYSTEMS AND METHODS FOR NAVIGATION

BACKGROUND OF THE INVENTION

Embodiments of the present invention generally relate to systems and methods for navigation and more particularly to systems and methods for a GPS-based or wireless location detection (e.g., ground based beacons, distance measurement sensors, etc.) navigation for outdoor environment systems and GPS-less location detection systems for the indoor environments where localization is performed as a mapping with, for example, SLAM methodology.

In our contemporary fast-paced world, navigation systems have become more popular and readily available. As inter and intra country travel has increased rapidly, the travelers need a variety of information in order to navigate safely and efficiently. The information needed for safe and efficient navigation may include the traveler's position at a given time, the traveler's direction of travel relative to a planned course of travel, the traveler's position relative to visible hazards, the visibility around the traveler's surroundings, and the like. The existing navigational systems fail to provide adequate information needed for safe and efficient navigation.

Prior art navigation devices are mostly GPS-based and are well known and widely used as consumer devices, for example car navigation devices, and as marine and submarine navigation systems. Such navigation devices are usually combined with computing units externally or integrally connected to the navigation device. Prior art systems may also include an associated navigation map storage integrated with a computing unit, with the computing unit operating to a) plot or compute an optimal or best route from the source address or location to a target address or location, b) monitor and keep track of current position relative to the plotted or computed navigation route, c) re-compute or re-plot an optimal or best route whenever necessary.

Currently available navigation systems are integrated with a display device and use various methods to display location and navigation information. Modern navigation devices display sections of stored map pictograms corresponding to a current location, as well as navigational directions in the form of visual and/or audible helpers. Visual helpers may include graphical signatures such as arrows, status bar indicators of upcoming turnings or junctions and so forth. In prior art systems, such schematic and abstract representations of the real world require users of a navigation device to interpret a pictorial view depicted on the display and visually associate it with real world surroundings.

Over the years the navigational systems have evolved from simple displaying view of geometrical road centerlines to providing overlaid images to help users navigate. However, existing navigational systems may be improved to provide enhanced navigational view with features to assist drivers while driving at night or in low visibility conditions. Moreover, the existing navigational systems may be improved to provide information regarding the surrounding of a traveler, thus enhancing safe navigation.

Prior art systems include integration of navigation device with video camera feed, where video camera is installed externally or internally and navigation system overlays navigation instructions on top on real-time video feed. This technology works in daylight conditions. However, at nighttime, this technology is not so useful.

Therefore, a need exists for an improved navigation system and method that provides a tool to allow safer navigation for a traveler while being efficient.

SUMMARY OF THE INVENTION

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

In accordance with one embodiment, a navigation system for travelers is presented. The navigation system, in one embodiment, comprises an information module. The information module gathers information from a plurality of sources. For example, the information module gathers information from a source such as a position determination module, implemented as a GPS device or alternatively based on ground based beacons, distance measurement devices, etc. As a user navigates using the information module, the information module may receive, through a communication module, one or more remote video feeds or a 3D data set corresponding to a GPS reading, for example, whereby the information module causes the navigation system to display generated video (view) of locations along the navigation path. In one embodiment, the one or more video feeds or a 3D data set are processed either remotely or locally by the information module, such that stationary objects in the video are removed before being displayed to the user of the navigation system. For example, if the original video (also referred herein as a "source" video) recording included cars parked on a street, the system can remove the images of these stationary cars before displaying to the user as the user navigates. In one embodiment of the invention, the video signal received by the information module may include a combination of video feeds, where the video feeds are combined at a remote server to generate multi-dimensional video for a specific location and given directional orientation parameters, to provide a broader video perspective from adjacent places or views. The source video feeds may reside in a data bank stored by the remote server. In one embodiment, generated video could be two dimensional. In another embodiment video generated could be a three dimensional video. In one embodiment, video generated could be generated as a FTV (free viewpoint video/television) or any other video generation and processing can be used.

In accordance with one embodiment, source video may be processed into a 3D data set.

In accordance with one embodiment, source images may be processed into a 3D data set.

In accordance with one embodiment, of the invention, information module processes a remotely or locally stored original 3D data set (also referred herein as a "source" 3D data set) containing spatial and optionally color information. In one embodiment a 3D data set may be fed from the data bank on a remote server to the information module of the navigation device, via a communication module. The source 3D data set may reside onboard the navigation device.

In one embodiment of the invention, the navigational system includes a camera that records video of a navigation path together with corresponding location provided by a Location determination module. The recorded source video feed may then be uploaded to the remote data bank so that users can collaborate with the addition of source video information that may then be further processed and used by other users as source video. The recorded source video feed can be GEO enhanced with corresponding coordinate information and directional orientation of recording as well as camera parameters. In one embodiment of the subject matter disclosed herein, the video camera may capture a two or three dimensional video signal to be uploaded to the remote server or can be stored locally by the onboard navigation device.

In one embodiment the camera may be coupled with a range finder or a laser based system, such as LIDAR for example, to provide depth information. Output of such a multidimensional camera may be processed into a 3D data set. In one embodiment, a multitude of images from one or multiple cameras may be processed into a 3D data set.

In one embodiment of the present invention, a navigation system is provided, either as a standalone navigation device or as an integrated system for personal digital assistants, smart glasses, for example Google glass, smart helmets with transparent display, mobile phones, smart watches, or wearable devices or any other type of hand held or "smart" type of devices. The navigation system may include an apparatus and a corresponding method for providing navigation directions in the form of a dynamically or synthetically generated multidimensional view which may be generated as free view point video with superimposed navigation instructions. In accordance with one embodiment, the navigation system integrates dynamically generated multidimensional video image generated based on the current location and directional information, and navigation instructions computed by the navigation device. One aspect of the present invention includes the display of a video signal generated based on a pre-recorded source video corresponding to the location and directional information, such that, for example, in low light conditions a video is generated for a given coordinate (x, y, z) and displayed together with an overlay of navigation instructions.

In one embodiment, a multidimensional view is generated based on a pre-generated 3D data set for a virtual camera position defined by location and directional orientation.

Another aspect of the invention involves the use of an environment sensing module providing information about objects nearby a navigation path and a processing module that integrates all the inputs into one usable view. The environment sensing module may determine the location, size and/or shapes, texture, temperature of objects in the vicinity of the navigation device. In one embodiment, the speed of non-stationary objects may also be determined.

In another embodiment, information derived from the environment sensing module may be superimposed onto a pre-recorded generated source video signal to produce a complete picture of the surrounding environment even without navigation directions being provided. In that embodiment the navigation device serves as an observational navigation tool providing situational awareness. In an alternative embodiment, environment information may be used m conjunction with navigation instructions superimposed onto a generated multidimensional video to provide a complete navigation solution for low visibility conditions.

In another embodiment, the navigation system comprises a user interface. The user interface enables the user to communicate with the navigation system and vice versa. In an alternate embodiment, the information module may get information from an orientation module. For example, the orientation module may comprise a compass. The compass may provide information to the navigation system to determine a direction of the navigation system's motion. Alternatively, the orientation module may comprise a gyroscope, for example, a gyroscope manometer. The gyroscope may be used to determine tilt of the navigation system. Alternatively, the gyroscope may be used to determine the orientation of the navigation system, the traveler, or a vehicle on which the gyroscope may be alternatively mounted.

In another embodiment of the subject matter disclosed herein, the navigation system may further comprise an accelerometer. For example, the accelerometer may be used to calculate the acceleration of the navigation system. In another embodiment, the information module may get information from an environment sensing module. The environment sensing module may comprise a multi-target radar, a range finder, a light sensor and a heat sensing sensor.

In one embodiment of the present invention, a navigation device includes a video generation module, which in turn may include an onboard, integrated wireless communication unit to access a remotely or wirelessly available video generator service. One function of the wireless communication unit is to request, from a remotely located and wirelessly accessible video view generator, a multidimensional video stream, such as a 2D or 3D data set, generated remotely in real-time, based on a combination of current location and directional orientation information produced by the navigation and orientation modules. The generated multidimensional video view is wirelessly fed back to the navigation device through the wireless communication unit, which, in turn passes the received generated view to the processor module for further processing and for subsequent output to the display device.

In one embodiment of the present invention, a navigation device includes a view generation module which, in turn, is comprised of an onboard, integrated wireless communication unit and an integrated, onboard multidimensional view generator. The communication unit is further arranged to wirelessly fetch a pre-processed 3D data set from a remote, wirelessly available 3D data set storage. The remote 3D data set storage may service requests from the wireless communication unit by sending back a segment of total 3D data set corresponding to the space adjacent to the location coordinates derived from the navigation module.

In one embodiment of the present invention, a navigation device may include a video generation module, which in turn comprises an onboard multidimensional view generator and onboard, integrated data storage of a pre-processed multidimensional source 3D data set. The video generation module may be configured to generate a video view for a requested location and directional orientation by reading from the data storage of a pre-processed source 3D Data set/video corresponding to the space adjacent to the current location and subsequently generating a video view for a current location and a current directional orientation.

In one embodiment, of the present invention, a navigation device is used in an indoor setting. GPS may not be used in such a case and hence localization and matching to the synthetic video view has to happen differently. Depth information from the environment sensing module may be correlated against a pre-generated 3D data set of the environment in order to identify current location of the navigation device relative to the 3D data set. Usually, for an indoors environment localization, a closed loop 3D data set will be used. To this end a specialized variation of the Simultaneous Localization and Mapping (SLAM) and scale invariant matching techniques maybe used.

In accordance with one embodiment, a method for navigating a traveler is provided. The method may comprise configuring a user interface for communicating with the user of a navigation system. The method may also comprise configuring a processing module to process data from at least one of an information module and a user interface.

The method for navigating may further comprise configuring the information module to get information from an orientation module. For example, the orientation module may be configured to determine direction, or to determine tilt, or to determine vibration, or to determine acceleration of motion. The basic function of orientation module is to determine tilt, yaw and pitch of the navigation device. The method for navigating further comprises configuring the information module to gather information from an environment sensing module. In one embodiment, the method for navigating comprises configuring the environment sensing module to gather information from a LIDAR, a multi-target radar, a range finder, or a heat sensor.

One object of the present invention is to provide a more objective or realistic view of surroundings that requires less visual interpretation from the user, especially when navigating at night time or under low visibility conditions. Present invention covers both an outdoor environment, where location determination is easily achieved with, for example, GPS device, as well as indoors where localization is difficult. Another object of the invention is to enable safe driving, intelligent highway safety systems, accident avoidance, accident elimination, collision avoidance, blind spot detection, anticipatory sensing, automatic vehicle control, and intelligent cruise control. Another object of the present invention is to provide a navigation or observation tool for low visibility conditions in the air, on the road, on the street and under water. Another object of the present invention is to provide navigation and situational awareness capability in the air. Another object of the present invention is to provide navigation and situational awareness capability for an indoor environment. For example, a firefighter entering a burning building requires navigation information how to get to certain apartment, located on certain floor and he requires situational awareness. Further details are provided in the following description and the annexed drawings, which set forth, in detail, certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

DETAILED DESCRIPTION

Figure 1:
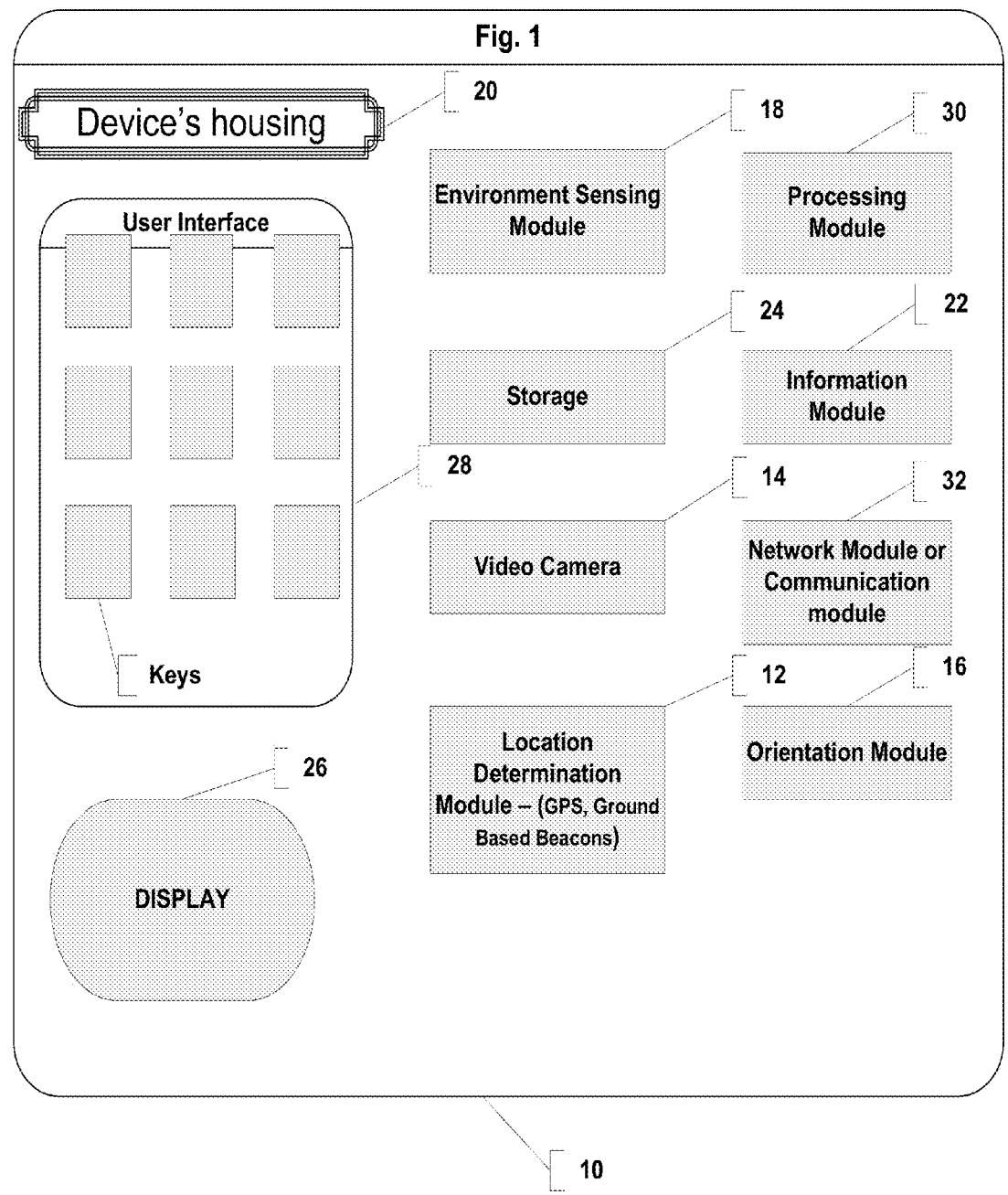
FIG. 1 illustrates a block diagram of a navigation system in accordance with an embodiment of the present invention.

The foregoing summary, as well as the following detailed description of certain embodiments of the subject matter set forth herein, will be better understood when read in conjunction with the appended drawings. As used herein, an element or step recited in the singular and preceded with the word "a" or "an" should be understood as not excluding the plural form of said elements or steps, unless such exclusion is explicitly stated. In this document, the term "or" is used to refer to a non-exclusive or, unless otherwise indicated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "software", "firmware" and "algorithm" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

The various embodiments and/or components, for example, the modules, elements, or components and controllers therein, also may be implemented as part of one or more computers or processors. The computer or processor may include a computing device, an input device, a display unit and an interface, for example, for accessing the Internet or Intranet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be comprised of other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit or processor capable of executing the functions described herein. The above examples are exemplary only, and are thus not intended to limit in any way the definition and/or meaning of the term "computer". In the following detailed description, reference is made to the accompanying drawings which form a part hereof, and in which are shown by way of illustration specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents. "Module" may connote any logical or functional or structural component of proposed system.

As used herein, the term "video signal" may include an image or series of images or video image frames. Images may be two dimensional (2D) or three dimensional (3D). Term "video signal" may refer to Free Viewpoint TV technology (FTV).

As used herein, the term "video" may include an image or series of images or video image frames.

As used herein, term "3D data set" may include 3D Model of reality or 3D point cloud with or without color information. Said "3D data set" contains spatial information. 3D point cloud or 3D Model with color represents a three dimensional photorealistic view of reality. 3D point cloud may be dense or sparse depending on how it was generated.

As used herein, "source 3D data set" refers to said 3D data set that contains 3D spatial information.

As used herein, the term "multidimensional" image or video or video signal refers to 2D or 3D image or video.

As used herein, the term "view" is used interchangeably with the term image or video.

In the following detailed description, reference is made to the accompanying drawings which form a part hereof, and in which are shown, by way of illustration, specific embodiments in which the subject matter disclosed herein may be practiced. These embodiments, which are also referred to herein as "examples," are described in sufficient detail to enable those skilled in the art to practice the subject matter disclosed herein. It is to be understood that the embodiments may be combined or that other embodiments may be utilized, and that structural, logical, and electrical variations may be made without departing from the scope of the subject matter disclosed herein. The following detailed description is, therefore, not to be taken in a limiting sense, and the scope of the subject matter disclosed herein is defined by the appended claims and their equivalents.

FIG. 1 illustrates a block diagram of a navigation system 10 in accordance with an embodiment. The navigation system 10, in one embodiment, comprises an information module 22. The information module 22 gathers information from a plurality of sources. For example, the information module gathers information from a source such as a location determination module 12 that may determine location passed on GPS, ground based beacons, or distance measurement sensors. The location determination module 12 calculates the current position of the navigation system. For example, the location determination module 12 may communicate with a GPS satellite and determine the coordinates of the navigation system. Alternatively, in one embodiment of the subject matter disclosed herein, an enhanced reading of the GPS location information may be performed. For example, the location determination module 12 may detect signals from cellular radio towers to determine the location of the navigation system. Furthermore, the location may be cached to avoid interruptions in wireless service, for example. Also, for example, the information module 22 gathers information from a source such as a multidimensional video camera 14. In one embodiment of the invention disclosed herein, the video camera 14 may capture and generate a two dimensional video signal. Alternatively, the video camera 14 may capture and generate a three dimensional video signal. Alternatively, the video camera may generate imagery coupled with depth information, for example RGB-D formatted output. In one embodiment, the video camera 14 may further have the capability to capture images at night time. In another embodiment, the video camera 14 may receive near-infrared light having a wavelength that is not visible to the human eye. Alternatively, the video camera 14 may use any other technology to photograph people and objects at night. Alternatively, the video camera 14 may be able to capture images at night time, or low light images in color. The video camera 14 may be attached to the navigation system itself or may be attached to the body of an automobile.

In an alternate embodiment, the information module 22 may get information to use for navigating from an orientation module 16. For example, the orientation module 16 may comprise a compass. The compass may provide information to the navigation system to determine the direction of the navigation system's motion or trajectory. For example, the compass may indicate the direction that a user should take to reach a destination. Most importantly, the compass may be used to identify directional orientation and provide that directional orientation as input to a video generator module and obtain a generated video stream based on a combination of the current position and directional orientation. Furthermore, additional motion measurement devices may be provided. For example, a flux-gate compass may be provided in addition to the compass.

In one embodiment, the orientation module may comprise a gyroscope. The gyroscope may be used to determine tilt of the navigation system. In an exemplary embodiment a gyroscope may be used to sense tilt rate on a plurality of axes. For example, the gyroscope is adapted to sense tilt in at least two axes. For example, the gyroscope may be adapted to sense tilt in at least three axes.

In one embodiment, the orientation module may comprise a Geomagnetic Sensor, in one embodiment, the orientation module may include Timing & Inertial Measurement Unit (TIMU) chip that does absolute position tracking on a single chip without GPS aided navigation.

In one embodiment of the present invention, orientation sensors may be 3, 6 or 9 axis sensors, for example, Bosch Sensortec line of orientation sensors.

In another embodiment of the invention disclosed herein, the navigation system may further compringe an accelerometer. For example, the accelerometer may be used to calculate the acceleration of the navigation system in at least one coordinate. In another embodiment, the accelerometer may determine acceleration as a vector in four-dimensional space-time.

In another embodiment, the information module may get information from an environment sensing module 18. The environment sensing module 18 may gather information related to the condition data of the traveler's surroundings. In some embodiments, the information gathered by the environment module 18 may be stored in a database associated with the data bank of source video feeds, for example, in order to assist with the processing of stored source video feeds with respect to removal of stationary objects. For example, the database may be part of the environment sensing module. Alternatively, the database may be at a remote location outside of the navigation system. For example, the database may be on a cloud server. Alternatively, the information may be stored in local memory storage 24. In another embodiment, the environment sensing module 18 may be used to derive information about objects, their size, shape, speed, etc., which are in the vicinity of the navigation device. This information is further used to enrich generated multi-dimensional video signals. Information about objects is superimposed onto a pre-recorded source video feed with or without navigation instructions being superimposed, providing objective and realistic views of surroundings.

The environment sensing module 18 may further comprise a multi-target radar. In one embodiment of the subject matter disclosed herein, the radar may be integral to the environment sensing module, being housed within the navigation system housing 20. Alternatively, the radar may be external to the navigation system housing 20.

The environment sensing module 18 may further comprise a rangefinder. It should be noted that the term rangefinder may be used interchangeably with "telemeter." A rangefinder mechanism, as part of the navigation system, may allow the traveler to know a subject's distance from the navigation system. For example, the rangefinder may alert the traveler if there was a subject too close to the traveler. Additionally, the rangefinder may provide the traveler with actual distance measurements overlaid on a map on the display 26, showing where a subject is in the surroundings.

The environment sensing module 18 may further comprise a heat sensor. It should be noted that the heat sensor may be used interchangeably with thermal sensors or temperature sensors. In one embodiment, the navigation system may have a plurality of heat sensors. In an exemplary embodiment, the heat sensors as used in the subject matter disclosed herein may be used to measure the thermal radiant power of the infrared or optical radiation that they receive from a known or calculated area on the surface of an object being measured, or a known or calculated volume within the object. For example, the volume within the object may be measured where the object is semitransparent within the measuring wavelength of the heat sensor.

In accordance with one embodiment, generated 3D data set is input into the processor module and the processor module fuses and superimposes navigation instructions over the data set. Processor module may further produce video signal as an image or sequence of image frames. Thus, a generated video stream combined with navigation instructions is fed to the display of the navigation device. Optionally, the navigation system can also be integrated with the environment sensing module with technologies such as multi-target radar, rangefinder, laser, etc. One function of the environment sensing module is to provide information about moving and stationary objects surrounding the location of the navigation apparatus. Information from the environment sensing module may also be superimposed onto the generated 3D data set for consequent output to the display of navigation device.

Alternatively, in yet another embodiment, a generated multi dimensional data set is integrated with an output of the environment sensing module, without requiring navigation instructions to be overlaid on the pre-generated 3D data set or generated video signal. In this embodiment, information about non-stationary objects in the vicinity of the navigation device is fused into or superimposed on a generated multidimensional data set. In this implementation such navigation device becomes more of an observational tool and enables better visual orientation.

In one embodiment, output of the environment sensing module is superimposed onto multidimensional video signal (image), whereby video signal is synthesized based on pre-generated 3D data set, such as, for example, photorealistic 3D point cloud, for specified coordinate and location information.

In another embodiment, the navigation system may comprise a user interface 28. The user interface enables the user to communicate with the navigation system and vice versa. In some embodiments, a typewriter-like keyboard of buttons (hard keys) may be included in the user interface. Alternatively, one or more soft keys may be included. The soft keys may be assigned functions in accordance with a mode of operation of the navigation system. Alternatively, the user interface may have hard keys, or soft keys, or any combination thereof. In one embodiment, user interface may be represented by NLP (natural language processor) engine with a microphone instead of keyboard, where spoken language of the user is analyzed and interpreted. User commands are recognized and input into the navigation system as directives.

In one embodiment, a display 26 is provided to display images, video, maps, directions, text, or any combination thereof. Alternatively, a portion of the display may be devoted to labels for the soft keys.

In one embodiment, the navigation system comprises a processing module 30. The processing module 30 is configured to perform a plurality of processes. For example, the processing module processes data obtained from the information module 22. Alternatively, the processing module may also process data obtained from the user interface. In one embodiment, the processing module 30 may be configured to compute an optimal path for navigation.

The navigation system may be a handheld device or may be available as a fixture within an auto body. For example, the navigation system may be implemented either as a standalone navigation system or as an integrated system for PDA, hand held device or wearable device or any other type of device that services the above mentioned purpose.

Additionally, in one embodiment, the navigation system may further include a communication module 32, also referred to herein as a network module 32. The network module is preferably a wireless communication module and may be part of the video generation module. The network module 32 may allow the navigation system to receive data to be used in navigation via a network. The network module 32 may allow the navigation system to relay data from the navigation system to a server or to a remote database in order to add to an existing data bank of source video feeds or bank of source 3D data set and navigational data. In one embodiment, the navigation system communicates data (e.g., download or upload data updates when the vehicle is parked) over a wired network. Alternatively, the navigation system may communicate data over a wireless network. For example, the data communicated from one navigation system may be shared or may be made accessible to a plurality of navigation systems.

The system hereby proposed, relies on availability of a data set representing environment in the vicinity of navigation system. Such data set may be represented, in one embodiment, by 2D or 3D images or video that maybe processed into photo realistic 3D Model and/or 3D point cloud. In one embodiment, a data set representing the environment may be a 3D Model or a 3D point cloud with or without color information. In one embodiment, a 3D point cloud may be a dense point cloud as for example, produced by a Reigl sensor. In one embodiment, a 3D point cloud may be a sparse point cloud as for example, produced by Velodyne laser scanner. A 3D Model or 3D point cloud with color information may provide photorealistic 3D view of reality. In one embodiment, an image may be represented by an RGB-D formatted data or RGB-C formatted data.

In one embodiment, source images/video signals or processed 3D Model or 3D point cloud may be GEO enhanced.

Over the past two decades there were a number of technologies developed to capture observable reality in multiple dimensions in a schematic and/or photo-realistic fashion. This is useful for enabling many of situational awareness (SA) and navigation applications by allowing generation of a view for a given coordinate (location) and directional orientation, also known as intermediate point of view.

In an outdoor environment where localization is easily performed with GPS, ground based beacons or other instruments that may be used to provide a point of reference. In an indoor environment setting, localization may be done differently, for example, by using SLAM techniques. There are passive and active 3D image acquisition and mapping strategies.

In one embodiment, a form of passive 3D mapping may be performed utilizing stereo vision method, where two images captured from adjacent cameras are juxtaposed to determine differences between two images and obtain depth map or distance to object information. This may be achieved, for example, with scale invariant correlations of images. Using such a depth map it is possible to build a 3D Model and optionally a 3D data cloud with or without color information, representing observed reality. Images may be captured, for example, by CCD (charge-coupled device) or CMOS (complementary metal-oxide-semiconductor) sensors. There is a variety of different methods available to build 3D data sets from 3D or 2D Images.

In one embodiment, a form of passive 3D mapping is performed utilizing the juxtaposition of images taken in motion by a moving camera. If the distance between the locations where two images are captured is known, it is possible to build a depth/distance map of environment being photographed and from the depth map a 3D point cloud may be derived.

Other possible forms of passive 3D mapping embodiments include a focus/defocus strategy, obtaining depth or shape/silhouette information from shades, texture and so on.

In one embodiment, a form of active 3D mapping may be implemented by combining CMOS or CCD color sensor and variation of depth sensor. Color sensor yields RGB per pixel and depth sensor provides depth or distance information per pixel. Generally, this is black and white image, where white pixels may denote "far" whereas, black pixels may denote "close" or vice versa. A good example of such technology is Microsoft Kinect with dual sensor, based on a range camera developed by Israeli company PrimeSense. Depth sensor couples an IR emitter with a monochrome CMOS sensor to measure depth of/distance to pixel.

In one embodiment, given the directional orientation of a camera and current location coordinates (x,y,z), as determined by GPS or any other localization method or device, it is possible to estimate coordinates per pixel and thus convert RGB-D (depth) to what we call RGB-C (color-coordinate) system and represent it as a GEO enhanced 3D data set with color information. Estimation of RGB-C may be computed as current (x,y,z) coordinates, expressed as either relative or absolute, for example UTM coordinates, using triangulation or trilateration. There may be multitude of other methods to estimate and determine coordinate per pixel, based on current coordinates and directional orientation and given camera calibration parameters.

In one embodiment, LIDAR may be used to generate a 3D Model and a 3D point cloud. LIDAR based system coupled with an RGB sensor, such as CMOS or CCD, may produce a 3D Model and a 3D point cloud with color information. LIDAR may be used to track objects.

In one embodiment, range finder may be used to generate a 3D Model or a 3D point cloud or to track objects in real-time.

In other embodiments a multitude of types of radars might be used to generate a 3D Model or a 3D point cloud or to track objects.

In one embodiment, Time of Flight (ToF) technique may be used to measure distance/coordinates. Here the measurement is taken of how long it takes for a light pulse to traverse (fly) to the target and back after it gets reflected by the target. Given a constant speed of light, it is possible to accurately compute distance to the target. Multitude of laser impulses fired in a sequence. Average response time may be taken in the computation of the distance. The technique may rely on sub-nanosecond timing circuitry to achieve high precision.

In one embodiment, multiple frequency phase-shift (PF) method may be used to estimate distance. This method depends on sinusoidal modulation of intensity of transmitted light. The round trip time is turned into a phase shift.

In one embodiment, frequency modulation continuous wave (FMCW) method may be used. Laser power is frequency modulated with a ramp or sinusoidal wave. The reflected signal has a time delay relative to the emitted one. The time delta is used to compute the distance.

In one embodiment, various Interferometry based methods may be used to measure distance to the object. Interferometry utilizes the principle of superposition to combine monochromatic light wave (one wavelength).

Some other methods might be used, for example: Ultraviolet Laser Induced Florescence (UV-LIF) and Differential Scattering (DISC) technique. A number of other methods, are available to determine the distance to the object or to estimate its relative or absolute coordinates.

Figure 2:
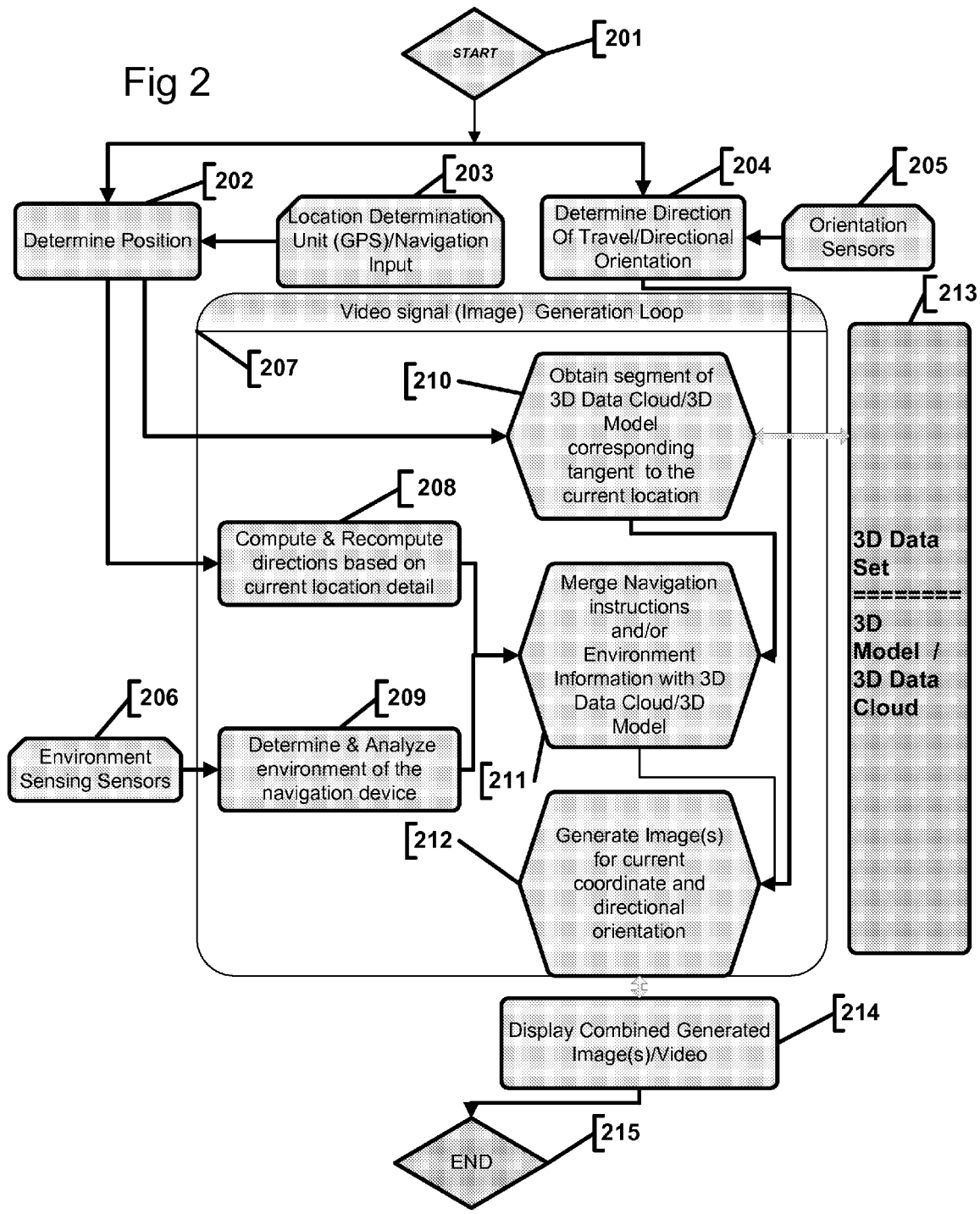
FIG. 2 is a process flow diagram illustrating a navigation display process in accordance with an embodiment of the present invention.

In FIG. 2 a process flow of navigation system is depicted. Navigation system, for example, allows the user, under low visibility conditions to accurately see a photo-realistic view of current environment with an overlay of environment information about current environs in the vicinity of the navigation device. Here the view is generated for any location and point of view, aka intermediate point of view.

The process starts at 201, the system initiation process may include turning a navigation system to on "ON" state, for example, by pressing START button. At 202 current coordinates are determined, using 203 location determination mechanism, for example GPS device. Step 203 may include, for example, GPS or ground based beacons or DMI (Distance Measurement Instruments) or inertia measuring instruments and so on. At step 204 the system determines the directional orientation of the system, utilizing 205 orientation determining sensors. At 207, the process includes an environment sensing step, where the system obtains information about the objects in the vicinity of the navigation device. Environment information may include but not be limited to objects and object's properties, such as size, shape, texture, location, color, speed and direction of movement as well as temperature and so on. In one embodiment, object recognition may be implemented for the objects observed by the environment sensing module. Thus, environment information may include annotations with object's description and object description parameters, assuming the object was recognized and classified.

Step 206 represents a video signal generation loop, here an image or a sequence of images is synthetically generated for the current directional orientation of the user and current location coordinates, in real time as the navigation system changes its position or orientation. As part of the video signal generation loop process, for current position and orientation a information local segment of 3D data set may be obtained at step 209 from locally stored or remotely situated sources.

Both locally or remotely stored source 3D data set information may be pre-generated using a number of techniques for multidimensional data set generation including multidimensional camera recording systems, using both passive and active 2D or 3D image capture and processing techniques. Both locally or remotely stored source 3D data set information may be based on pre-recorded and optionally pre-processed image(s) information stored.

In one embodiment, the 3D data set maybe produced in real-time from a number of adjacent cameras located in the vicinity of the navigation device, providing a real-time view for a specific location and orientation of the user.

In one embodiment, a 3D data set may be generated real-time from number of a 2D or 3D cameras located in the vicinity of the navigation device. In one embodiment, a 3D data set may be generated locally, onboard the navigation device, based on the source video signals received from remotely available video signal data source. At step 210, environment information, obtained at step 208, is fused into a 3D Model/3D point cloud obtained at step 209 to generate a complete 3D data set reflecting current environs surrounding the navigation device. Optionally, environment information is merged into a 3D data set with respect to spatial proportionality of space, distance and object sizes within a 3D data set. In step 208 of the process flow, system may analyze, classify and synthesize environment information obtained at step 207. The objects in the vicinity of the navigation device may be recognized and classified, the resulting object's descriptive information may optionally be superimposed onto a 3D data set, at step 210 or onto a generated image, at step 211. In this embodiment, Augmented Reality (AR) view of reality will be produced for the user. In one embodiment, a 3D data set may have color information and thus present a photo-realistic view of reality.

Video signal is generated for the current position and current directional orientation with embedded and superimposed environment information at step 211. Video signal generated at 211 is consequently fed onto display of the navigation device at step 213. The end of the process is signified by step 214, and may connote shutting down of navigation device by turning it off, for example.

Video signal generation loop may be short circuited between steps 208, 210 and 211, where multiple images are generated based on the same local 3D data set with fused environment information with every change of the location parameters of navigation system. Steps 208→210→211 may continue until navigation system within location covered by local segment of 3D data set derived at step 209.

Figure 3:
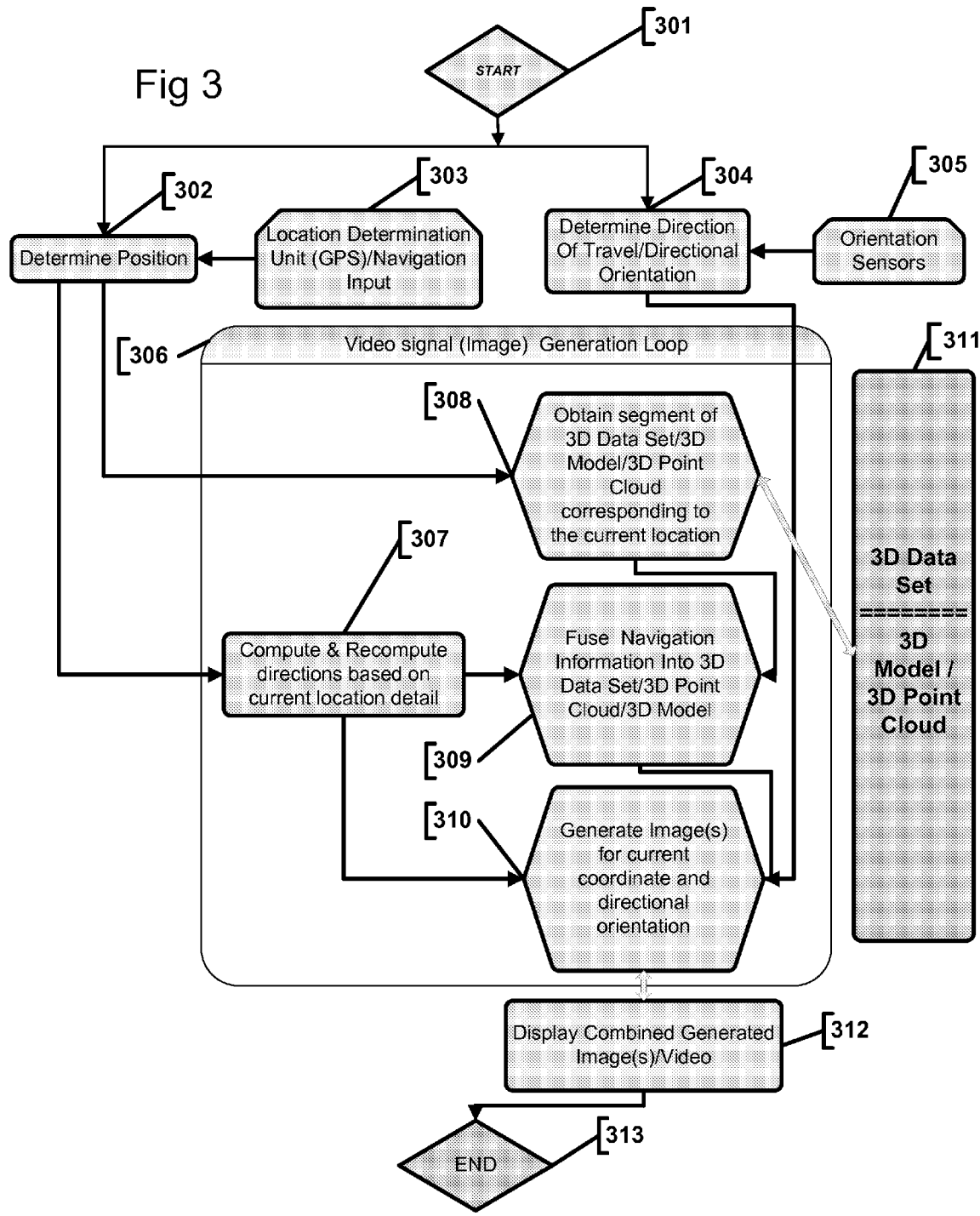
FIG. 3 is a process flow diagram illustrating a navigation display process in accordance with an embodiment of the present invention.

In FIG. 3 a process flow of navigation system is depicted. Navigation system, for example, allows the user, under low visibility conditions to see an accurate, photo-realistic view of the current environment with embedded navigation instructions.

The process starts at 301, the system initiation process may include turning a navigation system to on "ON" state, for example, by pressing START button. At 302 current coordinates are determined, using 303 location determination mechanism, for example, a GPS device. 303 may include, for example, GPS, ground based beacons, DMI (Distance Measurement Instruments), or inertia measuring instruments and so on. At step 304 the system determines directional orientation of the system, utilizing 305 orientation determining sensors. At 307, the process performs navigation instructions computation and synthesis based on current coordinates, obtained at step 302, and target destination coordinates, entered by the user via navigation device's user interface. At step 307 navigation instructions are recomputed as navigation device changes location. Re-computation of navigation instructions is performed constantly with every change of current position of said navigation device.

Step 306 represents a video signal (view) generation loop, here an image or sequence of images is synthetically generated for the current directional orientation of the user and current location coordinates in real time as the navigation system changes its position. As part of the video signal generation loop process, for the current position and orientation information, a local segment of the 3D data set is being obtained at step 308, from locally stored or remotely situated sources. The remote provider of a source 3D data set, representing, for example, a 3D point cloud information, may be based on pre-recorded and optionally pre-processed video/image information stored.

In one embodiment, a source 3D data set may be directly processed and generated, from a video signal output of at least one 3D camera or a plurality of 2D cameras (stationary cameras) adjacently located relative to the current location of the navigation device. In one embodiment, a 3D data set may be generated locally, onboard the navigation device, based on the source video signals received from a remotely available video data source. At step 309, navigation instructions information, obtained at step 307, are fused into a 3D data set, namely, into a 3D data set obtained at step 308 to generate complete 3D data set with navigation instructions. Optionally, navigation instructions are merged into 3D data set with respect to spatial proportionality of space, distance and object sizes within 3D data set. In one embodiment, a 3D point cloud may have color information and thus present a photo-realistic view of reality.

Video signal is generated for the current position and current directional orientation with embedded navigation information at step 310. Image or a sequence of images is generated at 310 and is consequently fed onto the display of the navigation device at step 312. The end of the process is signified by step 313, and may connote shutting down of navigation device by turning it off, for example.

In one embodiment, the objects in the vicinity of the navigation device may be recognized and classified, the resulting object descriptive information may optionally be superimposed onto a 3D data set, at step 309 or onto a generated image, at step 310. In this embodiment, Augmented Reality (AR) view of reality will be produced for the user.

The system may be arranged to generate a video signal for the current position and current directional orientation first and, as a second step in the process, overlay the navigation instructions over the generated set of image(s).

In one embodiment, 3D data set may be pre-processed for the removal of non-stationary objects. So that only objects which are permanently present, are part of the 3D data set. A method for removing stationary objects is disclosed, for example, in U.S. Pat. No. 5,627,915. Various other techniques may be used to identify and recognize non-stationary objects in the video feed or sequence of multidimensional images; using either passive-RGB image information methods only or active RGB and depth/coordinate information. The resulting 3D data set will only contain pristine, clean view of the environs, excluding non-stationary objects.

In one embodiment, in an outdoor environment setting, a 3D data set is GEO enhanced. Current location coordinates either relative or absolute, (for example UTM coordinates) are available to the system. Hence, in one embodiment, an environment sensing module may process environment information for relative or absolute location coordinates estimation, to enable merge and superimposition into a pre-processed 3D data set of current environs for consequent view generation for outputting the generated view to the display of navigation device. In one embodiment, processing module can process environment information for relative or absolute location coordinates estimation, to enable merge and superimposition into pre-processed 3D data set of current environs, for consequent view generation for outputting the generated view to the display of navigation device.

In one embodiment, the environment sensing module may identify and track different objects separately as discrete objects. The environment sensing module may output an object's estimated location, size, multidimensional shape, texture, color, temperature parameters and other object specific information.

In one embodiment, a processing module will juxtapose and compare objects registered and identified in a pre-generated 3D data set against output of the environment sensing module. Consequently, objects, identified by environment sensing module, which are missing in a 3D data set cloud will be fused into and superimposed onto pre-generated data set. In one embodiment, objects which are present in pre-generated 3D data set but not present in the current environment, as identified by environment sensing module, are especially marked as missing in the output view, optionally color coded, or alternatively, "missing" objects are removed from the 3D data set, so that output view is generated without the "missing" objects.

In one embodiment, the environment sensing module may produce RGB-D, which may optionally be converted into RGB-C (Red, Green, Blue-Coordinate) format where "C" coordinate is represented as either absolute (UTM) or relative value. RGB-C may be obtained by combining current UTM location information with depth values form RGB-D, in the context of directional orientation.

In one embodiment, the environment sensing module may produce depth images of current environment, further a 3D data set may be built reflecting current environs for further correlation against a pre-processed source 3D data set.

Depending on the type of environment sensing device/sensor/method used, different object recognition and tracking may be used.

In one embodiment, environment information may be juxtaposed and correlated with a photo-realistic, pre-processed 3D data set of space adjacent to the current location, to identify objects currently in the vicinity of the navigation device, which are not in original 3D data set. Consequently, identified objects may be specifically tracked by the system and may be merged into a pre-processed 3D data set. A photo realistic view generated based on the fused 3D data set and tracked objects in the vicinity of the navigation apparatus, for further output to the display.

In one embodiment, the process module generates a depth map for the current directional orientation and current position, based on a pre-generated photo realistic 3D data set. Assuming, in one embodiment, a environment sensing module produces a depth map image of the same view in real-time, for example, using CMOS or CCD sensors and IR emitter projecting structured light or LIDAR device, the process may correlate the two depth map images, to produce a disparity map. Disparity map shows objects that are different between the views. Objects that are not in the original 3D data set are the objects that the system wants to track and fuse into the current segment 3D data set for consequent view generation, and output the generated view onto the system's display.

In one embodiment, the process module derives a depth map for a virtual camera position, defined by the current directional orientation and current position, based on a pre-generated photo realistic 3D data set. Given environment sensing module produces a 2D depth map image of the same view in real-time, a variation of Similarity Invariant Descriptors (SID), for example, Scale-Invariant Feature Transform (SIFT) or Gradient Location and Orientation Histogram (GLOH), may be applied to juxtapose and correlate the two images, to detect and identify the objects which are in the current environs but not in the photorealistic 3D data set. Relative or absolute location and position of objects detected may further be determined using various methods. In one embodiment, a depth map can be correlated against a 3D data set directly.

In one embodiment, the process module may directly correlate output of the environment sensing a module against 3D data set to determine the delta in objects.

A SIFT Detector is an especially practical and efficient mechanism for correlating depth map images or 3D data set with different or changing scale and rotation. Specialized version of SIFT method may be used, especially geared towards analysis of depth map images versus a 3D Data set, or depth map produced for an intermediate position from a given 3D data set.

In one embodiment, a SIFT detector may be processing a multitude of sequential depth map images, are produced by the environment sensing module. SIFT extracts N number of features from sequential images and continues the analysis process in a loop, as the navigation system changes location and/or directional orientation. N features may be clustered into SIFT descriptors based on Euclidian distance and regional proximity. SIFT matching is performed for the set of N features against a source 3D data set or a depth map image, from a virtual camera position defined by the current location coordinates and directional orientation of the navigation system and generated based on pre-generated 3D data set. Matching may be performed by combining a number of techniques and algorithms, for example, nearest neighbor, Hough voting (with Hough transform), least-square affine parameter fit and other methods. Then, a Random Sample Consensus (RANSAC) model may optionally be used to improve results of the match by discarding outliers. The result of the process will be identification of objects which are in current environs of navigation system versus the 3D data set. RANSAC with affine transformation models, for example, may be used to compute, geometrically and proportionately the proper fusion of objects detected by the environment sensing module into a 3D Model segment for further view generation and output to the display of navigation device. This is only a general, exemplary description of one of the many ways to correlate environment module's output to a source 3D data set to identify any deltas and identify an overlay position of either environment or navigation instructions.

In one embodiment, SIFT may be used to correlate depth map image or a 3D model derived from the environment sensing module against a 3D data set directly.

In one embodiment, Speeded Up Robust Feature (SURF) model may be used to run object recognition and correlation between a depth map or a 3D model, produced by the environment sensing module and preprocessed 3D data set.

In one embodiment, Normal Aligned Radial Feature (NARF) may be used to run object recognition and correlation between a depth map or a 3D model, produced by the environment sensing module, and a preprocessed 3D data set.

In one embodiment, Binary Robust Independent Elementary Feature (BRIEF) may be used to run an object recognition and correlation between a depth map or a 3D model, produced by environment sensing module, and a preprocessed 3D data set.

In one embodiment, a 3D structure tensor may be used to execute object recognition and correlation between a depth map or 3D model, produced by environment sensing module, and a preprocessed 3D data set.

In one embodiment, Taylor and Hessian Invariant Descriptors may be used to execute object recognition and correlation between a depth map or a 3D data set, produced by the environment sensing module, and a preprocessed 3D data set.

In one embodiment, the environment sensing module may use a multi-target radar or a combination of other environment sensors to identify and track discrete objects and in real-time regime, feed changes in objects' parameters, into a 3D data set for further view generation.

There is a multitude of methods and algorithms available to achieve the task of detecting objects in current environment, which are not in the source 3D data set and properly fusing or overlaying their projected view onto original 3D data set for further output to the display. Provided here descriptions should not be taken as limiting the scope of the current invention, but should be conceived of as being exemplary only.

Figure 4:
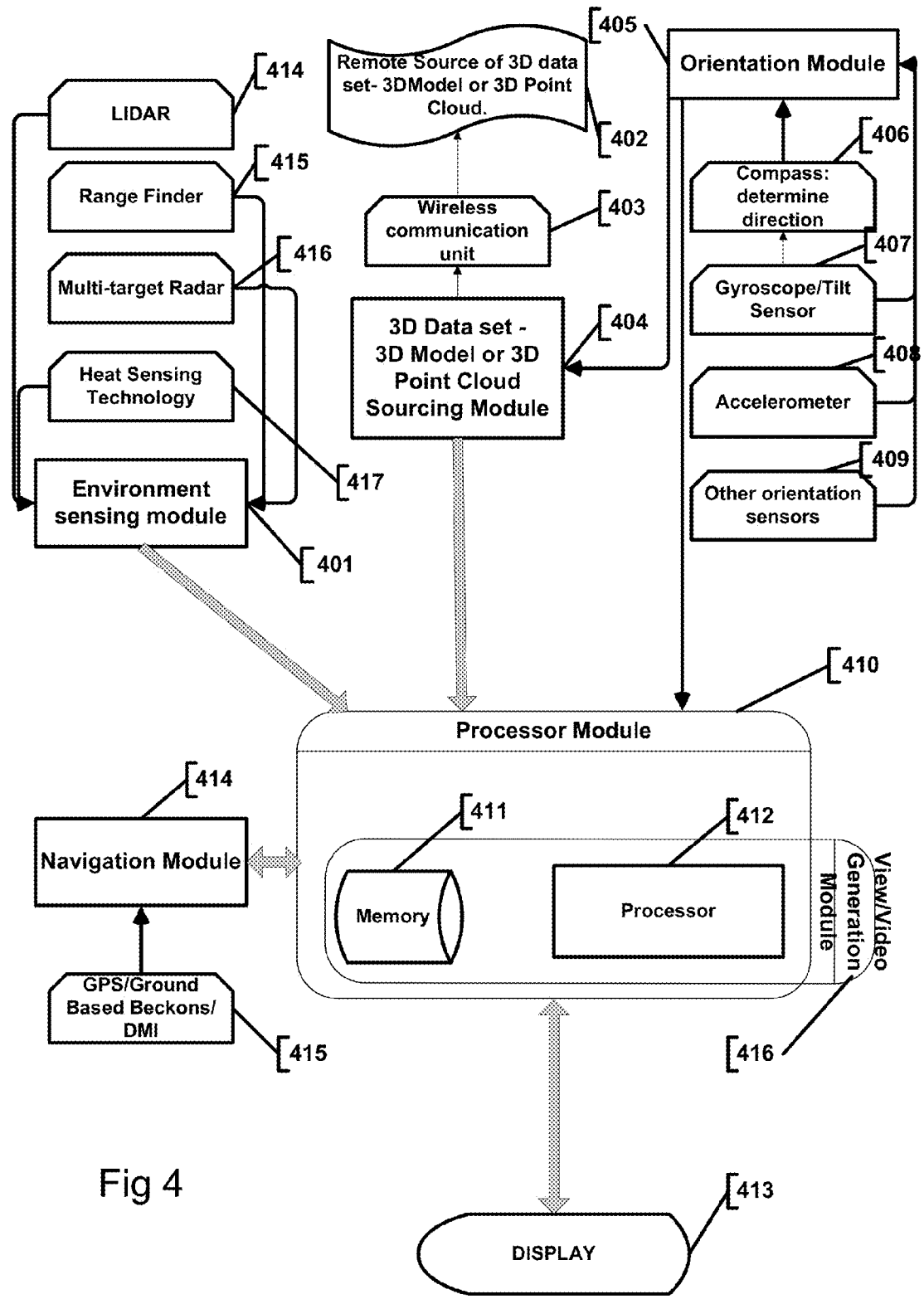
FIG. 4 illustrates an alternate embodiment of the navigation system of the present invention.

FIG. 4 depicts the structure of the navigation system which provides situational awareness to the user under low visibility conditions. The system includes 401 environment sensing module, which is responsible for identifying and tracking current environs of the said navigation system. Environment module may include one of or any combination of 414 a LIDAR 415 a Rage Finder, 416 a multi-target radar, 417 heat sensing sensors. Environment module may optionally include any other type of radar or night vision capability.

3D data set sourcing module 404 responsible for fetching segments of 3D data set corresponding to current location of navigation device. 404 sourcing module may include a wireless communication unit 403, responsible for sending requests to a remote server and receiving responses from remote server 402. A Request provides current location information, optionally in the form of UTM coordinates; the request is for a local segment of a global 3D data set or the entire available 3D data set. Remote server's 402 reply will contain the requested segment.

In one embodiment, the 3D data set sourcing module 404 may fetch the requested 3D data set or a segment of the global 3D data set from local storage 411 onboard the navigation device.

In one embodiment, the 3D data set sourcing module 404 may produce 3D data set based on at least one geo enhanced preprocessed video signal stored locally or remotely.

The orientation module 405 determines current directional orientation of the navigation system. The orientation module may include: a compass device 406, a gyroscope 407, a tilt sensor 407, an accelerometer 408, or any other sensors 409 that may be used to estimate directional orientation.

Navigation module 414, determines the current location of the navigation device and may include, inter alia, a GPS sensor 415, a ground based beckon sensor 415, a DMI (Distance Measurement Instruments) 415 or inertia measuring instruments and so on.

The processor module 410 is a multi-functional component and it may include a processor 412, permanent memory 411, or operating memory 411. The processor module 410 unifies and controls all components of the navigation device.

In one embodiment, the processor module 410 may request a 3D data set segment for the current location of the navigation system. The processor module 410 further analyses and correlates input from environment sensing module vis a vis content of the 3D data set fetched via 3D data set sourcing module 404. Furthermore, the processor module 410 may fuse and superimpose onto the 3D data set information about objects in the vicinity of the navigation system. Additionally, the processor module may recognize which objects in the 3D data set do not appear in the current environs as per input from the environment sensing module and may consequently mark those objects to signify that they are not located in current environment. Alternatively, those "missing" objects may be removed from the current segment of the 3D data set before video signal is generated for the current position and current directional orientation. Entire processing may be performed as part of video generation module 416.

In one embodiment, the processor module may first generate video signal for the current location and orientation of the user and secondly overlay navigation or environment information onto the pre-generated set of image(s).

Consequently, a view for current location coordinate and directional orientation is generated as a multidimensional video signal for output to the display 413.

Every change in either location coordinates, as detected by the navigation module, 414 or directional orientation, as detected by orientation module 405, will prompt a regeneration of the current view available for the output to the display.

In one embodiment, environment information can be preprocessed for object recognition and classification.

In one embodiment, 3D data set is GEO enhanced only on a segment level. Hence, association and correlation is required between 3D data set and environment information. Here SLAM method may be used.

Figure 5:
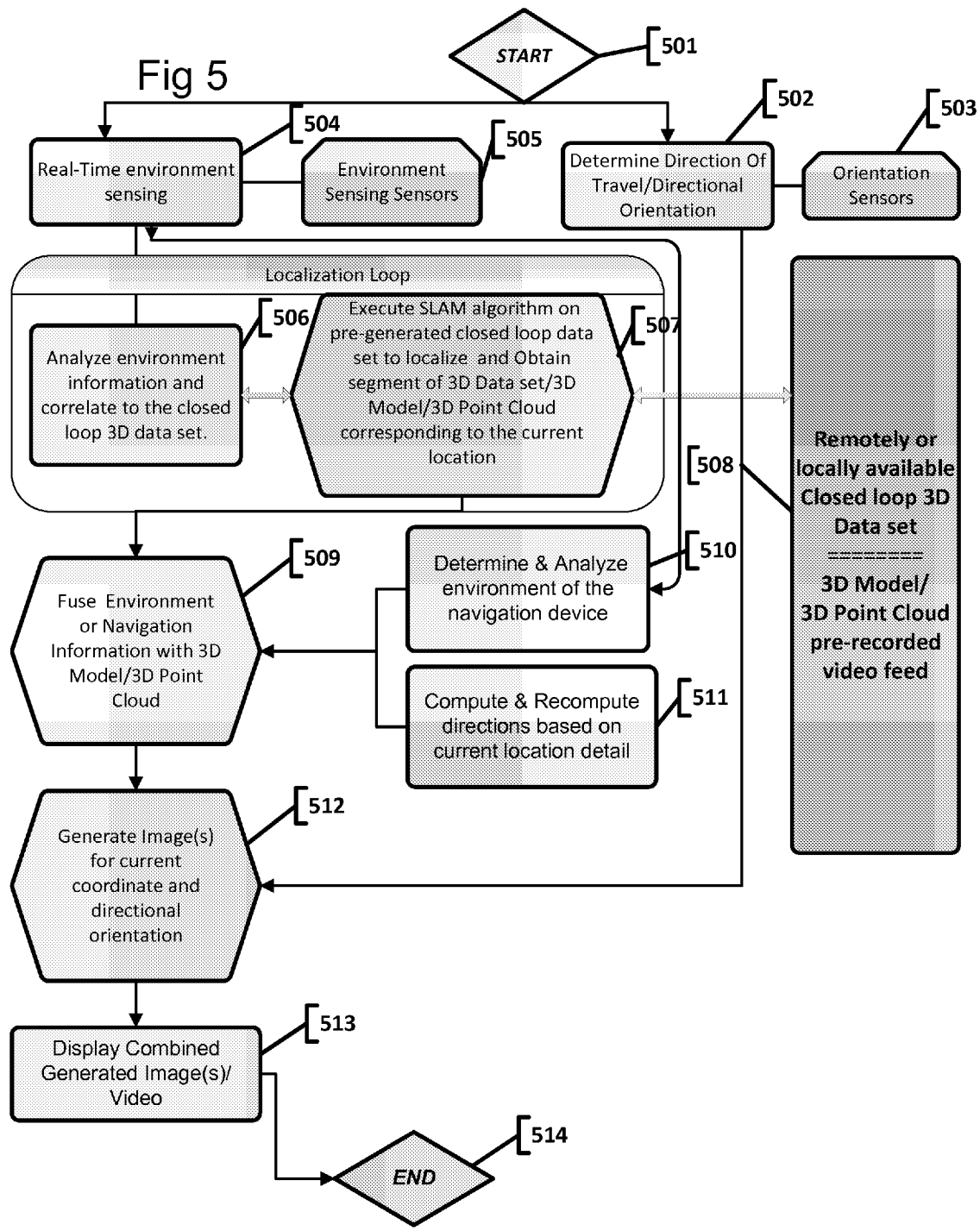
FIG. 5 is a process flow diagram illustrating a navigation display process in accordance with an embodiment of the present invention.

In FIG. 5, a process flow of the navigation system in an indoor environment is described. Here localization cannot be easily performed with any known sensor based technologies like GPS or ground based beckons or inertial measurement systems. The process starts at 501, which may include turning the navigation system to an "ON" state.

At step 502, the system determines directional orientation relying on various orientation sensors 503. At step 504, the navigation system performs real-time environment sensing/observation with various environment sensing sensors 505. Environment sensors may include but not be limited to LIDAR, a range finder, variety of radars (including a multi-target radar), heat sensors, infra-red sensors, a variety of night vision sensors. Information derived from those sensors may include 2D depth image, from which a 3D Model/maps of environment may be built or list of object descriptors describing objects in the vicinity of the navigation system (especially in the case of a multi-target radar). The environment sensing module may also include a 2D or 3D video camera(s), which outputs a multi-dimensional video signal.

Step 506 represents is a localization loop. The system analyzes environment information and correlates it to the closed loop 3D data set with the goal of determining current position of the navigation system relative to the closed loop data set.

At step 506, the navigation system may utilize a form of Indoor Positioning system (IPS) which may include but not be limited to Radio Frequency (RFID), Infra Red (IR) and other techniques. The navigation system may use a combination of IPS and SLAM to localize more efficiently.

Localization loop may be performed using a variation of Simultaneous Localization and Mapping (SLAM) method, for example, grid based FastSLAM algorithm may be used. In one embodiment the system relies on the availability of a 3D data set of an indoor environment, optionally, as a closed loop data set. Optionally, the 3D data set is represented as a 3D point cloud with color information, thus presenting a photorealistic view of the indoor environment. The data set is pre-generated. At step 507, navigation system utilizes SLAM with, for example, a variation of SIFT or GLOH to localize itself within the 3D data set and determine the current position and orientation with respect to the "global" 3D data set. Localization loop correlates against the "global" closed loop data set 508.

Once location/position within the "global" 3D data set is determined, the system fuses and superimposes environment or navigation information at step 509 over the "local" segment of the 3D data set. Here, "global" refers to the totality of the closed loop 3D data set, whereas "local" refers to a specific segment of the said "global" data set; which corresponds to the current location of the navigation device. In one embodiment, at step 510 the system determines and analyzes environment information (obtained at step 504). In one embodiment, at step 511, the navigation system computes and recomposes in a loop, the navigation instructions of how to best reach point B within the 3D data set from current whereabouts.

Furthermore, at step 512, the process generates a view for the current location and directional orientation with superimposed environment or navigation information. In one embodiment, the view may be generated from a 3D Model or 3D point cloud with color information, providing photorealistic view of reality at daylight.

In one embodiment the view may be generated for an intermediate position from pre-recorded video streams.

At step 513, generated video signal is output to display device.

The end of the process is signified by step 514, and may connote shutting down of navigation device by turning it off, for example.

Figure 6:
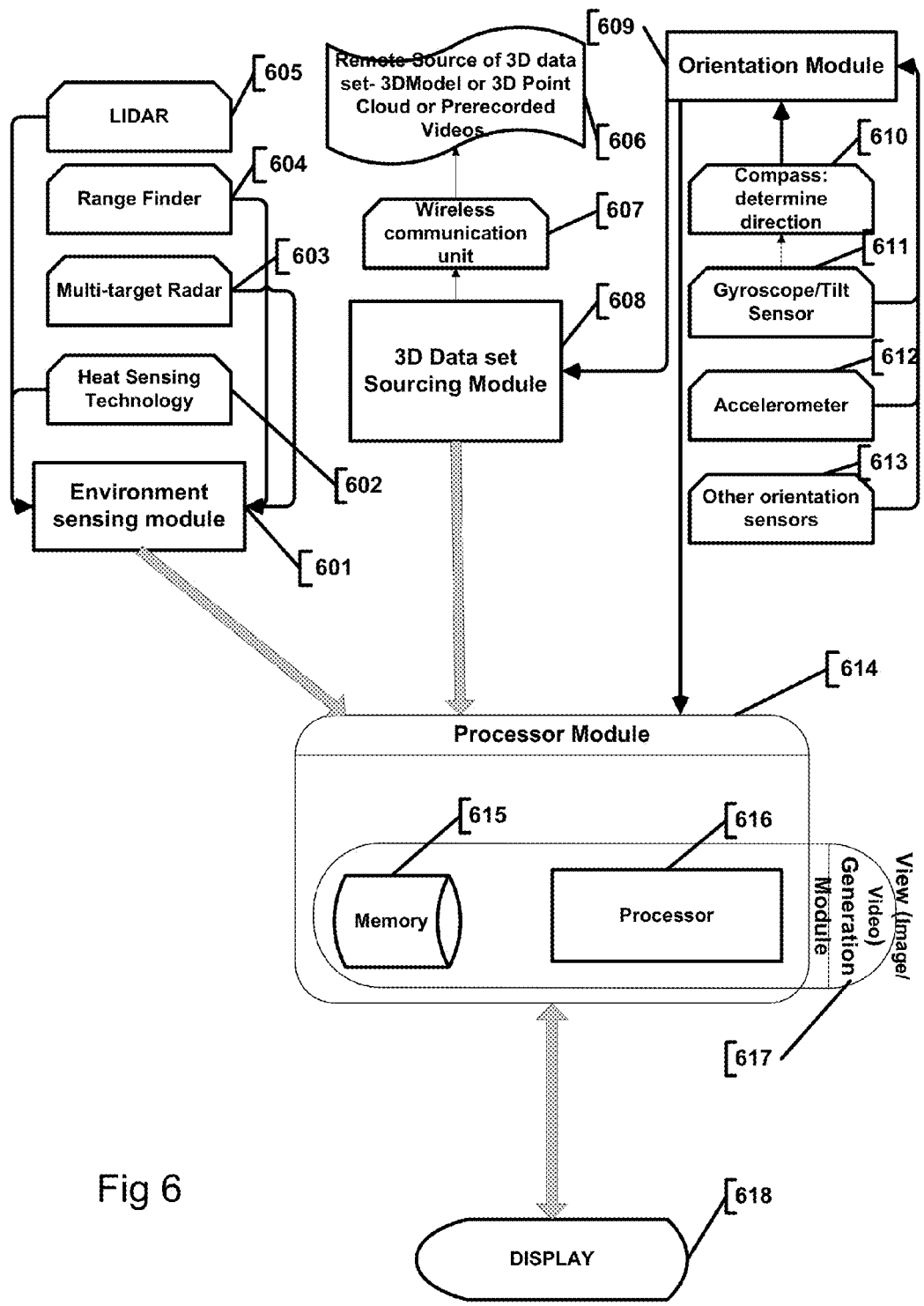
FIG. 6 illustrates an alternate embodiment of the navigation system of the present invention.

FIG. 6 depicts the structure of the navigation system which provides situational awareness to the user under low visibility conditions, in an indoor environment. The system includes 601 environment sensing module, that is responsible for identifying and tracking current environs of the said navigation system. The environment module may include one of or any combination of a 605 LIDAR, a 604 Range Finder, a 603 multi-target radar, 602 heat sensing sensors. Environment module may optionally include any other type of radar or night vision capability.

The 3D data set sourcing module 608 is responsible for fetching segments of the 3D Model or 3D Point cloud corresponding to the current location of the navigation device. 608 sourcing module may include a wireless communication unit 607, responsible for sending requests to a remote server and receiving a response from a remote server 606. The request provides current location information, optionally in the form of UTM coordinates; the request is for a local segment of the global 3D data set or the entire available 3D data set. Remote server's 606 reply will contain the requested segment.

In one embodiment, the 3D data set cloud sourcing module 608 may fetch the requested 3D Model/3D Point cloud from local storage onboard of the navigation device.

In one embodiment, the 3D data set cloud sourcing module 608 may produce a 3D Model/Point cloud based on at least one geo enhanced prerecorded video signal stored locally or remotely.

The orientation module 609 determines current directional orientation of the navigation system. The orientation module may include: a compass device 610, a gyroscope 611, a tilt sensor 611, an accelerometer 612, or any other sensors 613 that may be used to estimate directional orientation.

The processor module 614 is multi-functional component and it may include processor 616, 615 permanent memory or operating memory. Processor module 614 unifies and controls all components of the navigation device.

In one embodiment, processor module 614 may request a 3D Point cloud segment for the current location of the navigation system. Processor module 614 further analyses and correlates input from the environment sensing module vis a vis content of the 3D data set fetched at step 608. Furthermore, the processor module 614 may fuse and superimpose into a 3D data set information about objects in the vicinity of the navigation system. Additionally, the processor module may recognize which objects in the 3D data set do not appear in the current environs as per input from the environment sensing module and may consequently mark those objects to signify that they are not located in current environment. Alternatively, those "missing" objects may be removed from the current segment of the 3D data set before video signal is generated for the current position and current directional orientation. Entire processing may be performed as part of the video generation module 617.

Consequently, a view for current location coordinate and directional orientation is generated as a multidimensional video signal for output to the display 618.

Every change in either location coordinates, as detected by SLAM process, or in directional orientation, as detected by orientation module 609, will prompt regeneration of the current view available for the output to the display.

It is to be understood that the all above descriptions and embodiments are intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from the spirit of the invention and its scope. Many other embodiments will be apparent to those of skill in the art upon reviewing the above description. The scope of the subject matter disclosed herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first" "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the subject matter disclosed herein, including the best mode, and also to enable any person skilled in the art to practice the various embodiments of the subject matter disclosed herein, including making and using any devices or systems and performing any incorporated methods. The patentable scope of the various embodiments of the subject matter disclosed herein is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A navigation system comprising:
   a location determination module for determining a location of a user of the navigation system, where location information is used as a parameter for view generation;
   an orientation module for determining directional orientation of said user, where orientation information is used as a parameter for view generation module;
   a view generation module for outputting a multidimensional video signal generated from a source 3D data set for the current location and orientation of said user,
   wherein, said 3D data set contains both spatial and color information,
   wherein said 3D data set is actively or passively generated, from plurality of 2D images or at least one 3D image,
   wherein said 3D data set is generated in a real-time or prerecorded mode, and
   a display module to display said generated multi-dimensional view overlaid with environment information in the vicinity of said user or navigation instructions.

2. The system of claim 1, where environment information related to the environment in the vicinity of said user or navigation instructions is fused into said 3D data set prior to video signal generation or superimposed over the view generated for current location and directional orientation of said user.

3. The system of claim 1, further comprising: said view generation module outputting a multidimensional colored view generated based on source 3D data set with color information and wherein, 3D data set is geo enhanced by associating location information with separate sections of 3D data set or by associating every point in the 3D data set with the coordinate or depth information, wherein coordinate information is relative or absolute.

4. The system of claim 1, further comprising a communication unit for sending a request to a remote server, the request including said location information, and for receiving from said server, said source 3D data set or generated video signal.

5. The system of claim 1, further comprising: a navigation module for computing said navigation instructions or an environment sensing module for detecting said environment information; a processing module for fusing navigations instructions or environment information into said 3D data set prior to video signal generation or superimposing navigation instructions or environment information onto the generated multidimensional video signal to create said overlaid video signal and sending the overlaid video signal to the display unit.

6. A method for navigation comprising:
   obtaining location information from a location determination module, where location information is used as a parameter for a view generation module;
   obtaining directional orientation information from an orientation module, where orientation information is used as a parameter for said view generation module;
   generating a multidimensional video signal for outputting a multidimensional video signal generated from a source 3D data set for the current location and orientation of a user,
   wherein, said 3D data set contains both spatial and color information,
   wherein said 3D data set is actively or passively generated, from plurality of 2D images or at least one 3D images,
   wherein said 3D data set is generated in a real-time or prerecorded mode, and
   displaying said generated multi-dimensional view overlaid with the environment information in the vicinity of said user or navigation instructions.

7. The method of claim 6, where environment information related to the environment in the vicinity of said user or navigation instructions is fused into said 3D data set prior to video signal generation or superimposed over video signal generated from said 3D data set.

8. The method of claim 6, further comprising: said view generation module outputting a multidimensional photo realistic view generated based on source 3D data set with color information and wherein, 3D data set is geo enhanced by associating location information with separate sections of 3D data set or by associating every point in the 3D data set with the coordinate or depth information, wherein coordinate information is relative or absolute.

9. The method of claim 6, further comprising: enriching generated video with information related to and annotating objects in the vicinity of the navigation device to produce augmented reality view.

10. A navigation system comprising:
    an environment sensing module to determine environment information in the vicinity of a user, where output of environment sensing module is used by localization process to determine location or directional orientation of said user;
    a view generation module for outputting a multidimensional video signal generated from a prerecorded source 3D data set and corresponding to said user's current location and directional orientation of said user;
    wherein, said 3D data set contains both spatial and color information,
    wherein said 3D data set is actively or passively generated, from plurality of 2D images or at least one 3D images, and
    a display module to display said generated multi-dimensional view overlaid with navigation instructions or environment information in the vicinity of said user.

11. The system of claim 10, further comprising: a processing module, arranged to simultaneously localize and map by correlating output of environment sensing module against pre-generated 3D data set or prerecorded video feed.

12. The system of claim 10, further comprising: An orientation module for determining directional orientation of said user, where orientation information is used as a parameter to video generation module to produce a view for the provided orientation and location information derived from environment sensing module.

13. A method for navigation comprising:
    obtaining environment information from an environment sensing module to determine environment information in the vicinity of a user, where output of environment sensing module is used by localization process to determine at least location or directional orientation of said user,
    generating a multidimensional view from a prerecorded source 3D data set and the location and directional orientation of said user;
    wherein, said 3D data set contains both spatial and color information,
    wherein said 3D data set is actively or passively generated, from plurality of 2D images or at least one 3D images, and
    a display module to display said generated multi-dimensional view overlaid with navigation instructions or environment information in the vicinity of said user.

14. The method of claim 13, further comprising: simultaneously localizing and mapping by correlating output of environment sensing module against pre-generated 3D data set or plurality of pre-recorded video feeds.

15. The method of claim 13 further comprising: Determining the delta of objects between current environment information and pre-generated 3D data set; as well as displaying the delta objects as missing or present on the display.

16. The method of claim 13, further comprising: Obtaining directional orientation information from an orientation module, wherein orientation information is used as a parameter to video generation module to produce a view for the provided orientation and location information derived from environment sensing module.

* * * * *